United States Patent
Bullock et al.

(10) Patent No.: US 11,447,073 B2
(45) Date of Patent: Sep. 20, 2022

(54) SMART MIRROR AND HIDDEN COMPARTMENT ASSEMBLY FOR A VEHICLE

(71) Applicant: Gulfstream Aerospace Corporation, Savannah, GA (US)

(72) Inventors: John Bullock, Savannah, GA (US); William Rodriguez, Savannah, GA (US); Joshua Tatum, Savannah, GA (US); Stephen Spencer, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 4 days.

(21) Appl. No.: 16/949,181

(22) Filed: Oct. 19, 2020

(65) Prior Publication Data

US 2021/0114523 A1    Apr. 22, 2021

Related U.S. Application Data

(60) Provisional application No. 62/916,514, filed on Oct. 17, 2019.

(51) Int. Cl.
*B60R 1/12* (2006.01)
*G02B 5/08* (2006.01)

(52) U.S. Cl.
CPC .............. *B60R 1/12* (2013.01); *G02B 5/0808* (2013.01); *G02B 5/0816* (2013.01); *B60R 2001/1253* (2013.01)

(58) Field of Classification Search
CPC ...... G02B 5/0816; G02B 5/0808; B60R 1/12; B60R 1/1215; B60R 2001/1253

USPC ......................................................... 359/839
See application file for complete search history.

(56) References Cited

U.S. PATENT DOCUMENTS

| | | | |
|---|---|---|---|
| 6,560,027 B2 | 5/2003 | Meine | |
| 7,379,243 B2 * | 5/2008 | Horsten | G09F 13/12 359/320 |
| 7,500,755 B2 * | 3/2009 | Ishizaki | A45D 44/005 353/28 |
| 10,845,511 B2 * | 11/2020 | Cao | G02B 5/08 |
| 2004/0027695 A1 * | 2/2004 | Lin | B60R 1/083 359/839 |
| 2016/0292917 A1 * | 10/2016 | Dorner | G03B 21/2053 |
| 2017/0319148 A1 * | 11/2017 | Shahin | H04N 5/247 |
| 2018/0032227 A1 * | 2/2018 | Broxson | G06F 1/1605 |

(Continued)

FOREIGN PATENT DOCUMENTS

GB    2232520    * 12/1990

*Primary Examiner* — Ricky D Shafer
(74) *Attorney, Agent, or Firm* — LKGlobal | Lorenz & Kopf, LLP

(57) ABSTRACT

Mirror displays, mirror display and compartment assemblies, and methods for making mirror displays are provided. In one example, the mirror display includes a transparent mirror having a front surface facing in a forward direction and a back surface opposite the front surface. When a user is present in front of the front surface, the transparent mirror is configured to reflect a first image of the user from the transparent mirror back towards the user. A display panel is disposed adjacent to the back surface of the transparent mirror and is configured to display a second image that is transmitted through the transparent mirror to be viewable from the front surface.

16 Claims, 5 Drawing Sheets

(56) References Cited

U.S. PATENT DOCUMENTS

2018/0268747 A1* 9/2018 Braun ................ G06K 9/00671
2018/0343418 A1* 11/2018 Van Ness ............... H04N 7/142
2019/0191850 A1* 6/2019 Yoganandan ......... G06T 19/006

* cited by examiner

SMART MIRROR AND HIDDEN COMPARTMENT ASSEMBLY FOR A VEHICLE

CROSS-REFERENCE TO RELATED APPLICATIONS

This application is related to and claims all available benefit of U.S. Provisional Patent Application 62/916,514 filed Oct. 17, 2019, the entire contents of which are herein incorporated by reference.

TECHNICAL FIELD

The technical field relates generally to storage areas in vehicles, and more particularly, relates to assemblies that include a mirror configured to provide information to vehicle occupants and that have a hidden compartment for storage of items in vehicles, for example aircraft or the like.

BACKGROUND

Providing adequate and practical storage space for passengers and/or other occupants of vehicles has traditionally been a priority for vehicle manufacturers. For example, in an aircraft it is desirable to provide a safe and inconspicuous place for passengers and/or other occupants to store various items including valuables during a flight. Additionally, it is desirable for many passengers and/or other occupants to have access to information, such as, for example, flight information, weather, videos, or the like. Unfortunately, space is often limited in many vehicles and it is challenging to package the various storage compartments and/or devices for passengers and/or other occupants.

Accordingly, it is desirable to provide an assembly for a vehicle that addresses one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a mirror display, a mirror display and compartment assembly, and a method for making a mirror display are provided herein.

In a first non-limiting embodiment, the mirror display includes, but is not limited to, a transparent mirror having a front surface facing in a forward direction and a back surface opposite the front surface. When a user is present in front of the front surface, the transparent mirror is configured to reflect a first image of the user from the transparent mirror back towards the user. The mirror display further includes, but is not limited to, a display panel disposed adjacent to the back surface of the transparent mirror and configured to display a second image that is transmitted through the transparent mirror to be viewable from the front surface.

In another non-limiting embodiment, the mirror display and compartment assembly includes, but is not limited to, a mirror display subassembly. The mirror display subassembly includes a transparent mirror having a front surface facing in a forward direction and a back surface opposite the front surface. When a user is present in front of the front surface, the transparent mirror is configured to reflect a first image of the user from the transparent mirror back towards the user. A display panel is disposed adjacent to the back surface of the transparent mirror and configured to display a second image that is transmitted through the transparent mirror to be viewable from the front surface. The mirror display and compartment assembly further includes, but is not limited to, a compartment subassembly disposed adjacent to the mirror display subassembly. The compartment subassembly includes a compartment structure at least partially surrounding a compartment space.

In another non-limiting embodiment, the method includes, but is not limited to, obtaining a transparent mirror having a front surface facing in a forward direction and a back surface opposite the front surface. When a user is present in front of the front surface, the transparent mirror is configured to reflect a first image of the user from the transparent mirror back towards the user. The method further includes, but is not limited to, disposing a display panel adjacent to the back surface of the transparent mirror. The display panel is configured to display a second image that is transmitted through the transparent mirror to be viewable from to front surface.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Figure 1:
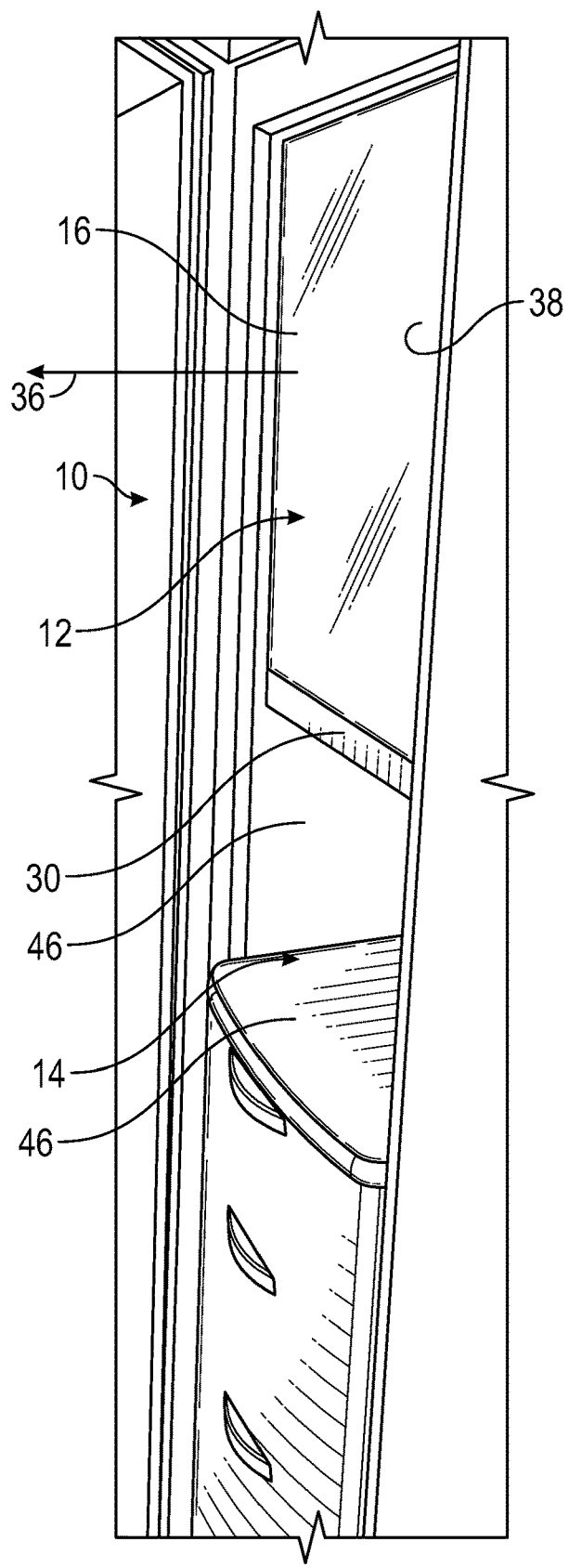
FIG. 1 illustrates a perspective view of a mirror display and compartment assembly in accordance with an exemplary embodiment.
Figure 2:
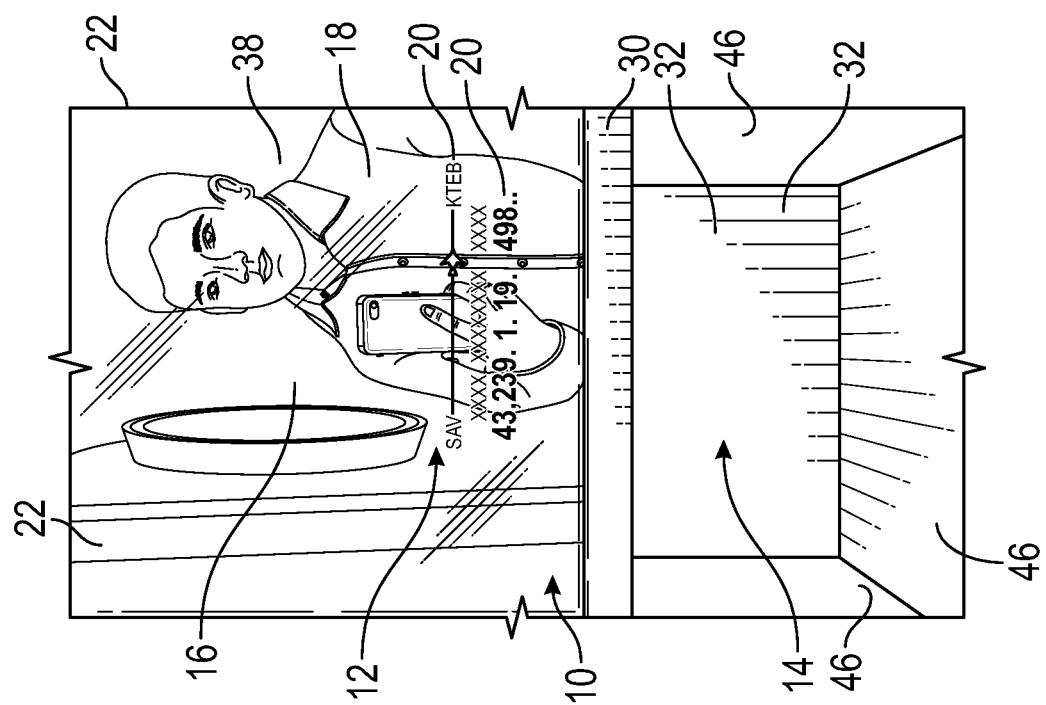
FIG. 2 illustrates a front perspective view of a mirror display and compartment assembly in accordance with an exemplary embodiment.
Figure 4:
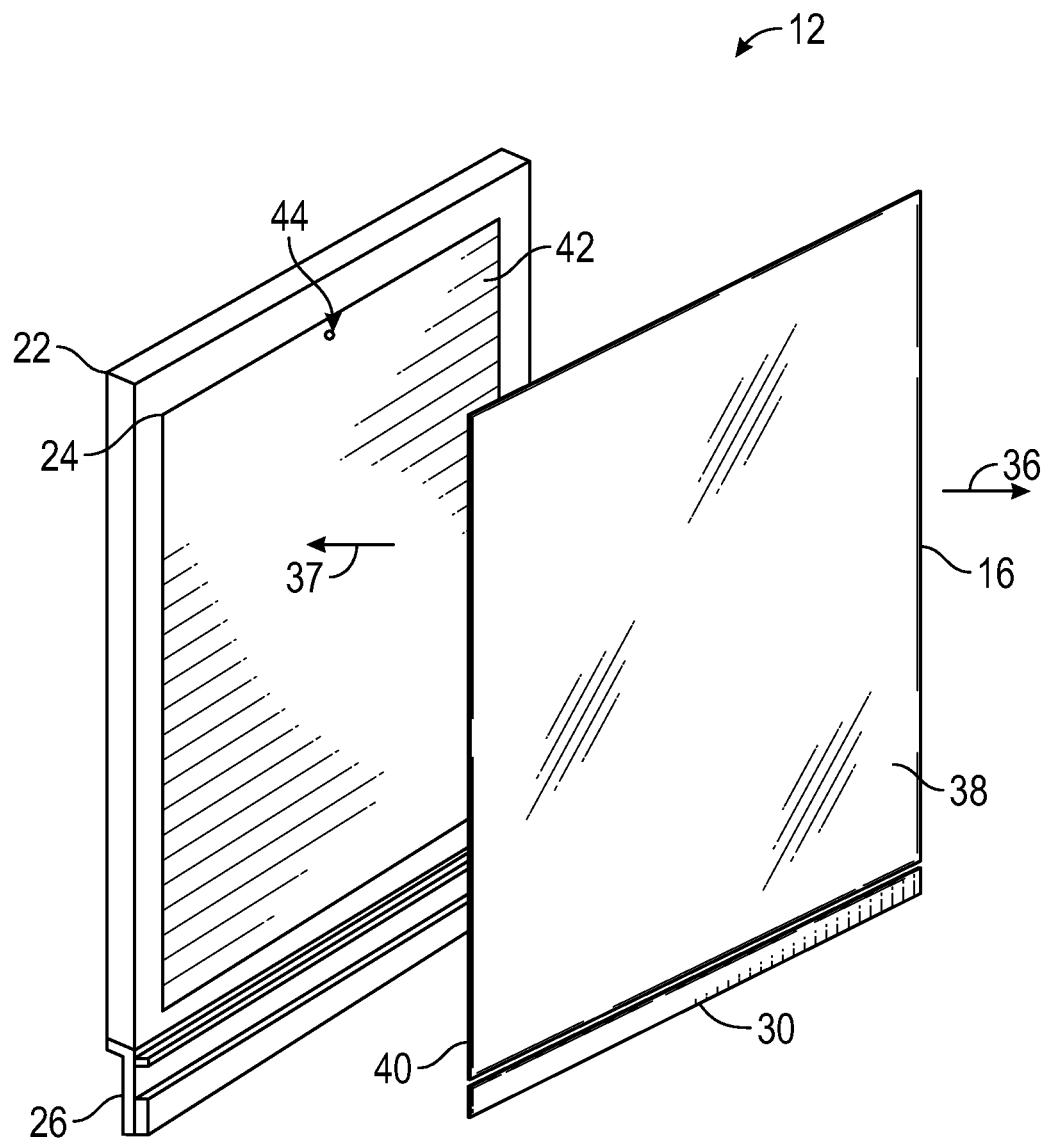
FIG. 4 illustrates an exploded view of a mirror display in accordance with an exemplary embodiment.
Figure 5:
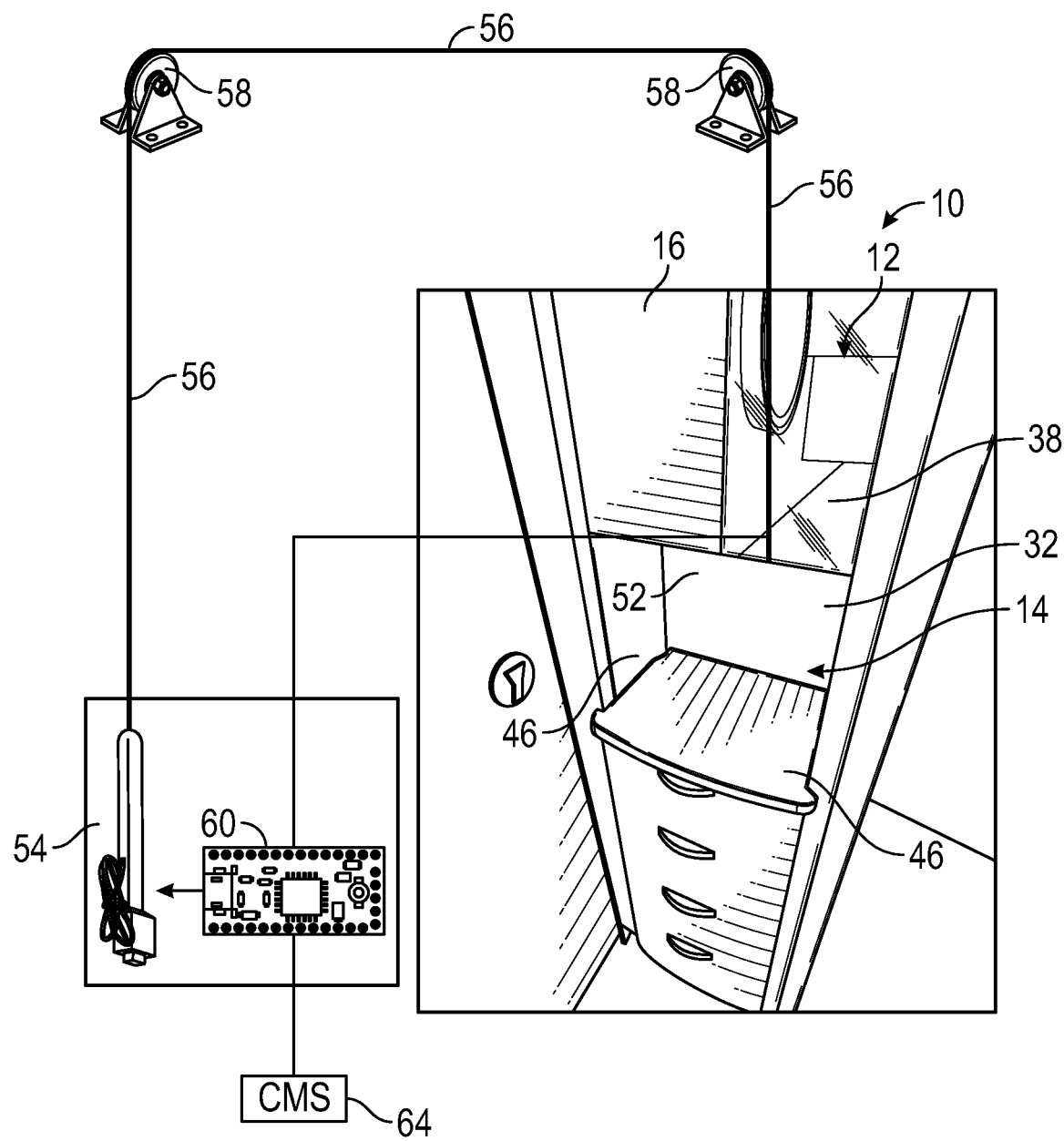
FIG. 5 illustrates a hybrid schematic and perspective view of a mirror display and compartment assembly in accordance with an exemplary embodiment.
Figure 6:
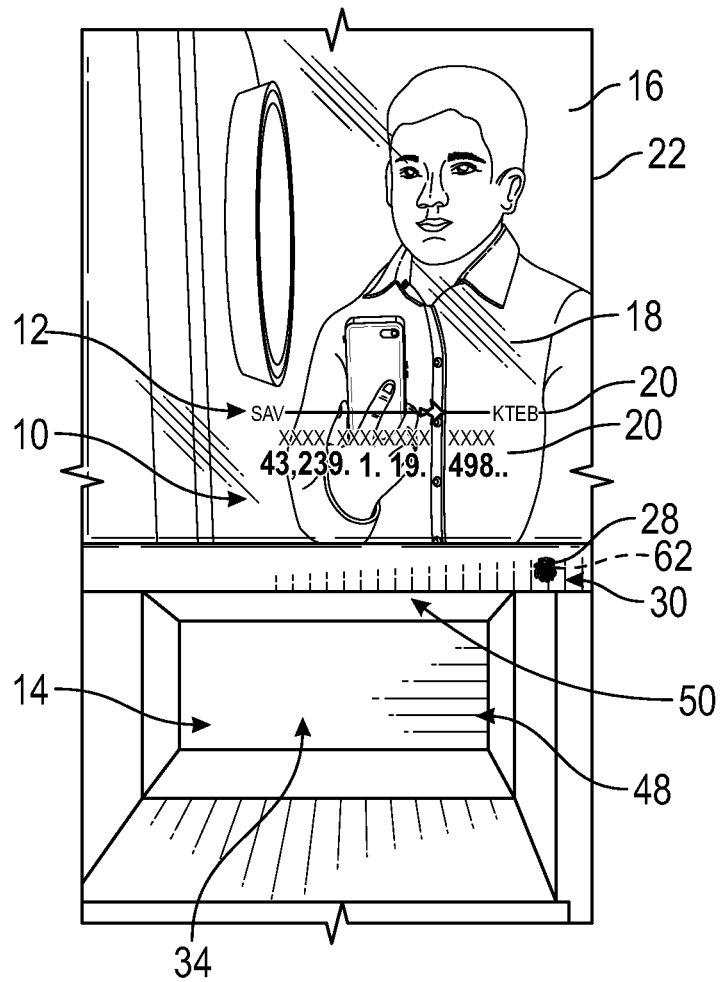
FIG. 6 illustrates a front perspective view of a mirror display and compartment assembly in accordance with an exemplary embodiment.

Referring to FIGS. 1-2 and 4, the exemplary embodiments taught herein provide a smart mirror and hidden compartment assembly 10 (also referred to herein as "mirror display and compartment assembly") for a vehicle. The mirror and hidden compartment assembly 10 includes a mirror display subassembly 12 (also referred to herein as "mirror display") and a compartment subassembly 14. As discussed in further detail below, the mirror display subassembly 12 includes a transparent mirror 16 that reflects images of an object(s)/user 18 that is in front of transparent mirror 16 in a forward direction (indicated by single headed arrow 36) back towards the object(s)/user while allowing a second image(s) 20 originating from behind (e.g., rearward 37 of) the transparent mirror 16 to be transmitted through transparent mirror 16 and displayed on a front facing surface 38 of transparent mirror 16 in the forward direction 36 so as to be visible to the user 18 viewing the front surface 38 of transparent mirror 16. As used herein, a transparent mirror is understood to mean a one-way mirror, also called two-way mirror (or one-way glass, half-silvered mirror, and/or semi-transparent mirror), is a reciprocal mirror that appears reflective on one side and transparent at the other.

In an exemplary embodiment, the transparent mirror 16 has a back surface 40 that is opposite the front surface 38. A display panel 24 is disposed adjacent to the back surface 40 of the transparent mirror 16. The display panel 24 is configured to display the second image 20 that is transmitted through the transparent mirror 16 to be viewable from the front surface 38.

In an exemplary embodiment, the display panel 24 includes at least one illumination display 42 that is configured to display information and/or media as the second image(s) 20. For example, the illumination display(s) 42 may display information such as weather information for one or more locations, flight information, time, financial market and/or stock information, travel information, for example flight information, videos, or the like. The illumination display(s) 42 may be a light-emitting diode (LED) display, a liquid crystal display, or an organic light-emitting diode (OLED) display. In an exemplary environment, the illumination display(s) 42 is an OLED display.

The mirror display subassembly 12 includes a frame 22 that is disposed about and/or at least partially surrounds and supports the transparent mirror 16. As illustrated, illumination display(s) 42 is disposed in the frame 22 behind the transparent mirror 16.

Figure 3:
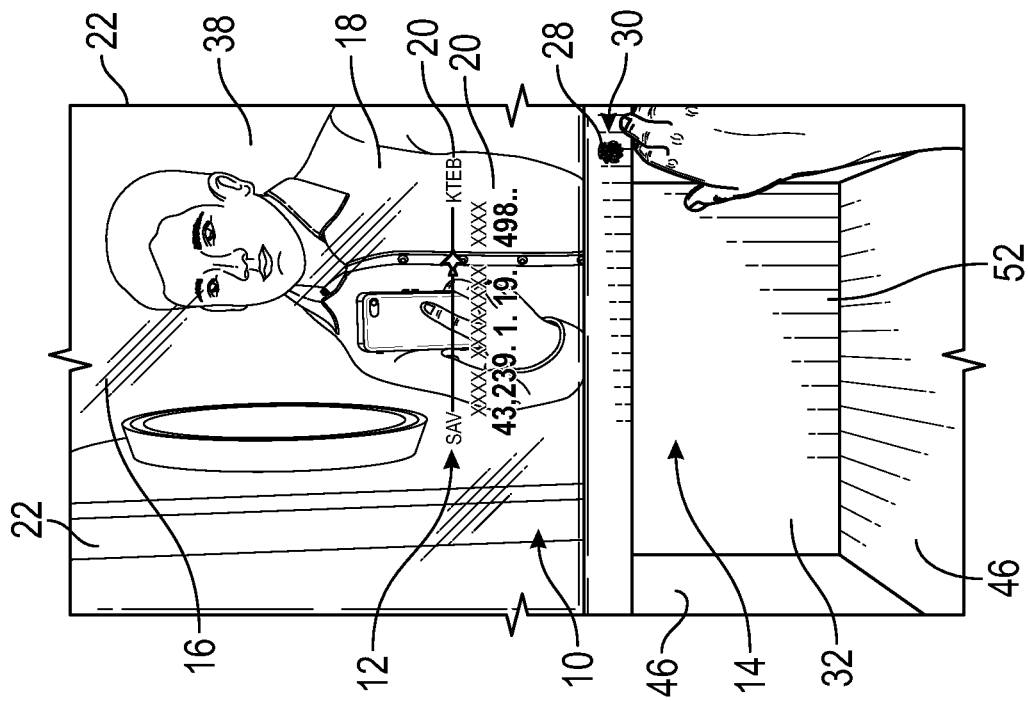
FIG. 3 illustrates a front perspective view of a mirror display and compartment assembly in accordance with an exemplary embodiment.

In an exemplary embodiment, the mirror display subassembly 12 further includes an optical sensor 44 (e.g., camera or the like) to detect when the user 18 is present in front of the front surface 38. As illustrated, the optical sensor 44 is incorporated into the illumination display(s) 42 but may be positioned elsewhere in the display panel 24, the frame 22, or the like. In an exemplary embodiment, the optical sensor 44 directs the mirror display subassembly 12 to operate in an awake mode in response to the presence of the user 18. For example, the display panel 24 may typically be in a sleep mode (shown in FIG. 1), and when the user (e.g., vehicle occupant) is in front of the transparent mirror 16 (shown in FIGS. 2-3), the display panel 24 will switch to, or be in, an awake mode and display information that is transmitted through the transparent mirror 16 and can be observed by the user 18. In an exemplary embodiment, when the mirror display subassembly 12 operates in the sleep mode, the second image 20 is prevented from being displayed and viewable from the front surface 38, and when the mirror display subassembly 12 operates in the awake mode, the second image 20 is transmitted from the illumination display 42 through the transparent mirror 16 to be viewable from the front surface 38.

Referring to FIGS. 2-6, in an exemplary embodiment, the compartment subassembly 14 of the mirror and hidden compartment assembly 10 is disposed adjacent to the mirror display subassembly 12. Although the compartment subassembly 14 is shown arranged under the mirror display subassembly 12, it is to be understood that the compartment subassembly 14 may be positioned elsewhere in adjacent relationship to the mirror display subassembly 12. For example, the compartment subassembly 14 may be arranged laterally adjacent to the mirror display subassembly 12, (e.g., on the left side or the right side), above the mirror display subassembly 12, or behind the mirror display subassembly 12, such as in the case where the mirror display subassembly 12 is pivotably mounted so that it can be opened and closed to expose and cover the compartment subassembly 14.

In an exemplary embodiment, the compartment subassembly 14 includes a compartment structure 46 at least partially surrounding a compartment space 48 to define a compartment 34. The compartment space 48 is sized or otherwise configured to store various items. As illustrated, a door 32 (e.g., sliding door) is operatively coupled to the compartment structure 46 adjacent to the compartment space 48 to move between an open position 50 (shown in FIG. 6) to allow access to the compartment space 48 and a closed position 52 (shown in FIGS. 2-3 and 5) to prevent access to the compartment space 48. As such, advantageously the compartment subassembly 14 with the compartment 34 is selectively hidden and accessible via the sliding door 32 to provide a secure compartment or safe for safely and inconspicuously storing valuable personal articles for the user(s) (e.g., vehicle passengers and/or other occupants). Further, for added security, the compartment subassembly 14 may formed as part of a cabinet and the door 32 has the appearance of being the rear wall of the cabinet but opens or otherwise slides out of the way to reveal the compartment 34 when a signal from a switch sensor 28 is produced, as discussed in further detail below.

In an exemplary embodiment, an actuator 54 is operatively coupled to the door 32 to move the door 32 between the open position 50 and the closed position 52. The actuator 54 may be a linear actuator, a circular actuator, a motor, or the like. As illustrated, a cable 56 is coupled to the actuator 54 at one end and at the other end is coupled to the door 32 and is supported therebetween by pulleys 58. The actuator, the cable 56, and the pulleys 58 may be arranged, for example inconspicuously out of sight, in the compartment structure 46, adjacent to the smart mirror subassembly, or elsewhere in the vehicle structure.

In an exemplary embodiment, a controller 60 is in communication with the actuator 54 and the mirror display subassembly 12 including the display panel 24 and the switch sensor 28. The switch sensor 28 is configured to selectively produce a signal, for example when actuated by the user, that is communicated to the controller 60. In response to the signal, the controller 60 produces a command signal that is communicated to the actuator 54 to direct the actuator 54 to move the door 32 from the closed position 52 to the open position 50 or vice versa.

In an exemplary embodiment, the mirror display subassembly 12 further includes a bezel 26 that is disposed adjacent to the frame 22, for example, below the frame 22 and that includes, carries, and/or supports one or more switches and/or sensors including the switch sensor 28. In an exemplary embodiment, the switch sensor 28 is configured as a sub-surface, capacitive switch, thumb or fingerprint reader, capacitive touch sensor(s), and/or thumb pad capacitive touch feature).

In an exemplary embodiment, a front panel 30 (e.g., front touch capable panel) is disposed over the bezel 26 including over the switch sensor 28 while allowing the capacitive touch function to illuminate or selectively illuminate (e.g., the sub-surface, capacitive sensor/switch becomes illuminated) when the user performs the appropriate gesture above the surface such as motion activated by waving a hand in front or very close to the switch sensor 28 to illuminate a backlight(s)) through the front panel). In an exemplary embodiment, the switch sensor 28 is a thumb or fingerprint reader that includes haptic feedback such that when it is touched by the user, the user feels vibrations when actuating the thumb or fingerprint reader. Further and as discussed above, when the thumb or fingerprint reader is illuminated and touched, contacted, or otherwise activated by the user, the switch sensor 28 sends a signal that is communicated directly or indirectly to a driver(s) (e.g., H-bridge driver or the like) that drives the actuator 54 to either open the door 32 to allow access to the compartment 34 or to close the door 32 to prevent access compartment 34.

In an exemplary embodiment, the switch sensor 28 includes a light source 62 (e.g., back light source) and is configured to produce a signal that directs the light source to illuminate at least a portion of an area of the front panel 30 when the switch sensor 28 detects a capacitance change in the area, for example when the user gestures a motion proximate the area. In an exemplary embodiment, the switch sensor 28 is configured to produce the signal to the controller 60 for directing movement of the door 32 only when the signal to the light source 62 is being produced.

In an exemplary embodiment, the controller 60 is in communication with a cabin management system 64 to receive the display information that is communicated to the illumination display(s) 42. The cabin management system 64 includes one or more processors and/or computers that receive and/or access various information, such as, for example, weather information for one or more locations, flight information, time, financial market and/or stock information, travel information, for example flight information, videos, or the like.

Figure 7:
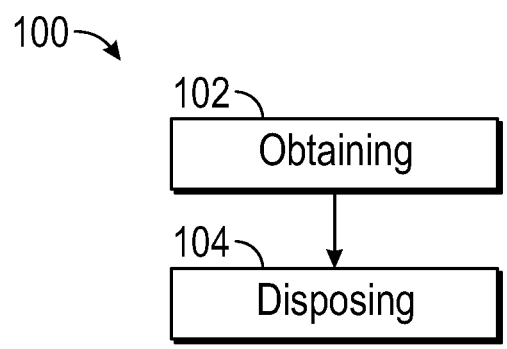
FIG. 7 illustrates a block diagram of a method for making a mirror display in accordance with an exemplary embodiment.

Referring to FIG. 7, a method 100 for making a mirror display is provided. The method 100 includes obtaining (STEP 102) a transparent mirror having a front surface facing in a forward direction and a back surface opposite the front surface. When a user is present in front of the front surface, the transparent mirror is configured to reflect a first image of the user from the transparent mirror back towards the user. A display panel is disposed (STEP 104) adjacent to the back surface of the transparent mirror. The display panel is configured to display a second image that is transmitted through the transparent mirror to be viewable from the front surface.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A mirror display and compartment assembly comprising:
   a mirror display subassembly comprising:
   a transparent mirror having a front surface facing in a forward direction and a back surface opposite the front surface, wherein when a user is present in front of the front surface, the transparent mirror is configured to reflect a first image of the user from the transparent mirror back towards the user; and
   a display panel disposed adjacent to the back surface of the transparent mirror and configured to display a second image that is transmitted through the transparent mirror to be viewable from the front surface; and
   a compartment subassembly disposed adjacent to the mirror display subassembly and comprising:
   a compartment structure at least partially surrounding a compartment space, wherein the compartment subassembly further comprises a door disposed adjacent to the compartment structure and configured to move between an open position to allow access to the compartment space and a closed position to prevent access to the compartment space, wherein the door comprises an actuator that is operatively coupled to the door to move the door between the open position and the closed position, wherein the mirror display subassembly further comprises:
   a controller that is in communication with the actuator; and
   a switch sensor that is in communication with the controller and that is configured to selectively produce a first signal that is communicated to the controller, and wherein the controller is configured to produce a first command signal that is communicated to the actuator to direct the actuator to move the door between the open position and the closed position in response to the first signal.

2. The mirror display and compartment assembly of claim 1, wherein the mirror display subassembly is configured to operate in a sleep mode and an awake mode, wherein when the mirror display subassembly operates in the sleep mode, the second image is prevented from being displayed and viewable from the front surface, and wherein when the mirror display subassembly operates in the awake mode, the second image is transmitted through the transparent mirror to be viewable from the front surface.

3. The mirror display and compartment assembly of claim 2, wherein the mirror display subassembly further comprises an optical sensor that is configured to detect when the user is present in front of the front surface and to direct the mirror display subassembly to operate in the awake mode in response to the presence of the user.

4. The mirror display and compartment assembly of claim 3, wherein the optical sensor is incorporated into the display panel.

5. The mirror display and compartment assembly of claim 1, wherein the display panel comprises an illumination display that is configured to display the second image.

6. The mirror display and compartment assembly of claim 5, wherein the mirror display subassembly further comprises a frame that at least partially surrounds the illumination display.

7. The mirror display and compartment assembly of claim 5, wherein the illumination display is selected from the group of a light-emitting diode display, a liquid crystal display, and an organic light-emitting diode display.

8. The mirror display and compartment assembly of claim 5, wherein the illumination display is an organic light-emitting diode display.

9. The mirror display and compartment assembly of claim 1, wherein the second image corresponds to at least one of weather information, flight information, time information, financial market information, stock information, travel information, and a video.

10. The mirror display and compartment assembly of claim 1, wherein the mirror display subassembly further comprises:

a front panel that is disposed adjacent to the transparent mirror, and the switch sensor is one of covered by and incorporated into the front panel.

11. The mirror display and compartment assembly of claim 10, wherein the front panel has a front panel surface that faces generally in the forward direction and a back panel surface opposite the front panel surface, wherein the switch sensor is generally aligned with an area of the front panel surface, and wherein the switch sensor is configured as a capacitive touch sensor that produces the first signal in response to the user touching or moving proximate the area.

12. The mirror display and compartment assembly of claim 11, wherein the switch sensor directs haptic feedback to the area when the user touches the area.

13. The mirror display and compartment assembly of claim 11, wherein the switch sensor further comprises a light source and is configured to produce a second signal that directs the light source to illuminate at least a portion of the area when the switch sensor detects a capacitance change in the area.

14. The mirror display and compartment assembly of claim 13, wherein the switch sensor is configured to produce the first signal only when the second signal is being produced.

15. The mirror display and compartment assembly of claim 13, wherein the second signal is produced when the user gestures a motion proximate the area.

16. A method for making a mirror display and compartment assembly, the method comprising the steps of:
  forming a mirror display subassembly including:
    obtaining a transparent mirror having a front surface facing in a forward direction and a back surface opposite the front surface, wherein when a user is present in front of the front surface, the transparent mirror is configured to reflect a first image of the user from the transparent mirror back towards the user; and
    disposing a display panel adjacent to the back surface of the transparent mirror, wherein the display panel is configured to display a second image that is transmitted through the transparent mirror to be viewable from the front surface; and
  disposing a compartment subassembly adjacent to the mirror display subassembly to form the mirror display and compartment assembly according to claim 1.

* * * * *